United States Patent
Koshizuka (10) Patent No.: US 8,097,329 B2
(45) Date of Patent: Jan. 17, 2012

(54) THIN FILM DEVICE HAVING THIN FILM ELEMENTS AND THIN FILM PATTERN ON THIN FILM ELEMENTS, AND METHOD OF FABRICATING THE SAME

(75) Inventor: Yasuo Koshizuka, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 356 days.

(21) Appl. No.: 11/820,824

(22) Filed: Jun. 21, 2007

(65) Prior Publication Data

US 2008/0090054 A1  Apr. 17, 2008

(30) Foreign Application Priority Data

Jun. 30, 2006  (JP) .................. 2006-180760

(51) Int. Cl.
*G03F 7/00* (2006.01)
*B32B 3/00* (2006.01)

(52) U.S. Cl. ............. 428/195.1; 428/220; 430/322

(58) Field of Classification Search ............. 428/195.1; 430/322
See application file for complete search history.

(56) References Cited

U.S. PATENT DOCUMENTS

| 5,279,643 A | 1/1994 | Kaneko et al. |
| 5,352,907 A * | 10/1994 | Matsuda et al. ............... 257/59 |
| 6,688,186 B2 | 2/2004 | Chae |
| 6,806,927 B2 * | 10/2004 | Nimura ................ 349/113 |
| 7,321,672 B2 | 1/2008 | Sasaki et al. |
| 2004/0266039 A1 * | 12/2004 | Ahn et al. ................ 438/30 |

FOREIGN PATENT DOCUMENTS

| CN | 2685924 Y | 3/2005 |
| JP | 53-020779 | 2/1978 |
| JP | 53-125763 | 11/1978 |
| JP | 61-094346 A | 5/1986 |
| JP | 06-037065 A | 2/1994 |
| JP | 2003-91510 A | 3/2003 |
| JP | 2003091510 A * | 3/2003 |
| JP | 2005-276029 A | 10/2005 |

OTHER PUBLICATIONS

Machine English Translation of JP 2003-091510 A, Yamada, Hiroyasu, Mar. 28, 2003, JPO, pp. 1-36.*
Japanese Office Action (and English translation thereof) dated Jun. 17, 2008, issued in a counterpart Japanese Application.
Chinese Office Action dated Dec. 19, 2008 (6 pages), and English translation thereof (5 pages), issued in a counterpart Chinese Application No. 2007101263714.
Taiwanese Office Action dated Oct. 29, 2010, and English translation thereof, issued in counterpart Taiwanese Application No. 096123422.

* cited by examiner

*Primary Examiner* — David Sample
*Assistant Examiner* — Tahseen N Khan
(74) *Attorney, Agent, or Firm* — Holtz, Holtz, Goodman & Chick, PC (57) ABSTRACT

A thin film device has a substrate having thin film elements, and an undercoat formed on the thin film elements of the substrate. The undercoat comprises at least one insulating film formed into a predetermined shape by closely adhering, exposing, and etching a film comprising a photosensitive resin material. The thin film device further has a thin film pattern formed into a predetermined shape on the undercoat.

18 Claims, 8 Drawing Sheets

THIN FILM DEVICE HAVING THIN FILM ELEMENTS AND THIN FILM PATTERN ON THIN FILM ELEMENTS, AND METHOD OF FABRICATING THE SAME

CROSS-REFERENCE TO RELATED APPLICATIONS

This application is based upon and claims the benefit of priority from prior Japanese Patent Application No. 2006-180760, filed Jun. 30, 2006, the entire contents of which are incorporated herein by reference.

BACKGROUND OF THE INVENTION

1. Field of the Invention

The present invention relates to a thin film device in which thin film elements are formed on a substrate and a thin film pattern is formed on the thin film elements, and a method of fabricating the same.

2. Description of the Related Art

In a thin film device in which thin film elements such as thin film transistors or photosensors are formed on a substrate, a thin film pattern such as a conductive film for preventing charging or detecting static electricity is formed on an undercoat for protecting the thin film elements and supporting the thin film pattern to be formed as an upper layer.

For example, in a fingerprint authentication device disclosed in Jpn. Pat. Appln. KOKAI Publication No. 2003-91510, an insulating protective film is formed between transistors constituting photosensors and a static electricity removing electrode on the surface. This insulating protective film constitutes an undercoat that protects the transistors and supports the static electricity removing electrode of the thin film pattern.

The static electricity removing electrode film in the fingerprint authentication device described above is formed by a transparent electrode and has a small film thickness of about a few hundred Å to a few thousand Å. The insulating protective film has a film thickness enough to protect the transistors, e.g., a film thickness of a few μm to a few ten μm. The static electricity removing electrode film is patterned into a predetermined shape in at least a peripheral region of the formation region of the transistors.

BRIEF SUMMARY OF THE INVENTION

A thin film device according to the first aspect of the present invention comprises a substrate having thin film elements, an undercoat formed on the thin film elements of the substrate and comprising at least one insulating film formed into a predetermined shape by closely adhering, exposing, and etching a film comprising a photosensitive resin material, and a thin film pattern formed into a predetermined shape on the undercoat.

A fingerprint detecting device according to the second aspect of the present invention comprises a substrate having photosensors for detecting a fingerprint of an object, and a transparent insulating film covering the photosensors, an undercoat formed on the transparent insulating film formed on the substrate and into a predetermined shape including a portion that corresponds to the photosensors, the undercoat comprising insulating films formed by dry films comprising a photosensitive resin, having different sizes, and stacked so that end faces thereof do not align with each other, and an antistatic film comprising a transparent conductive film formed into a predetermined pattern on the undercoat and the transparent insulating film on the substrate.

A thin film device fabrication method according to the third aspect of the present invention comprises steps of preparing a substrate having thin film elements, forming an undercoat comprising at least one insulating film formed into a predetermined shape by closely adhering at least one film comprising a photosensitive resin material on the thin film elements of the substrate, and exposing and etching the film, and forming a thin film pattern into a predetermined shape on the undercoat.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the generation description given above and the detailed description of the embodiments given below, serve to explain the principles of the invention.

DETAILED DESCRIPTION OF THE INVENTION

First Embodiment

Figure 1:
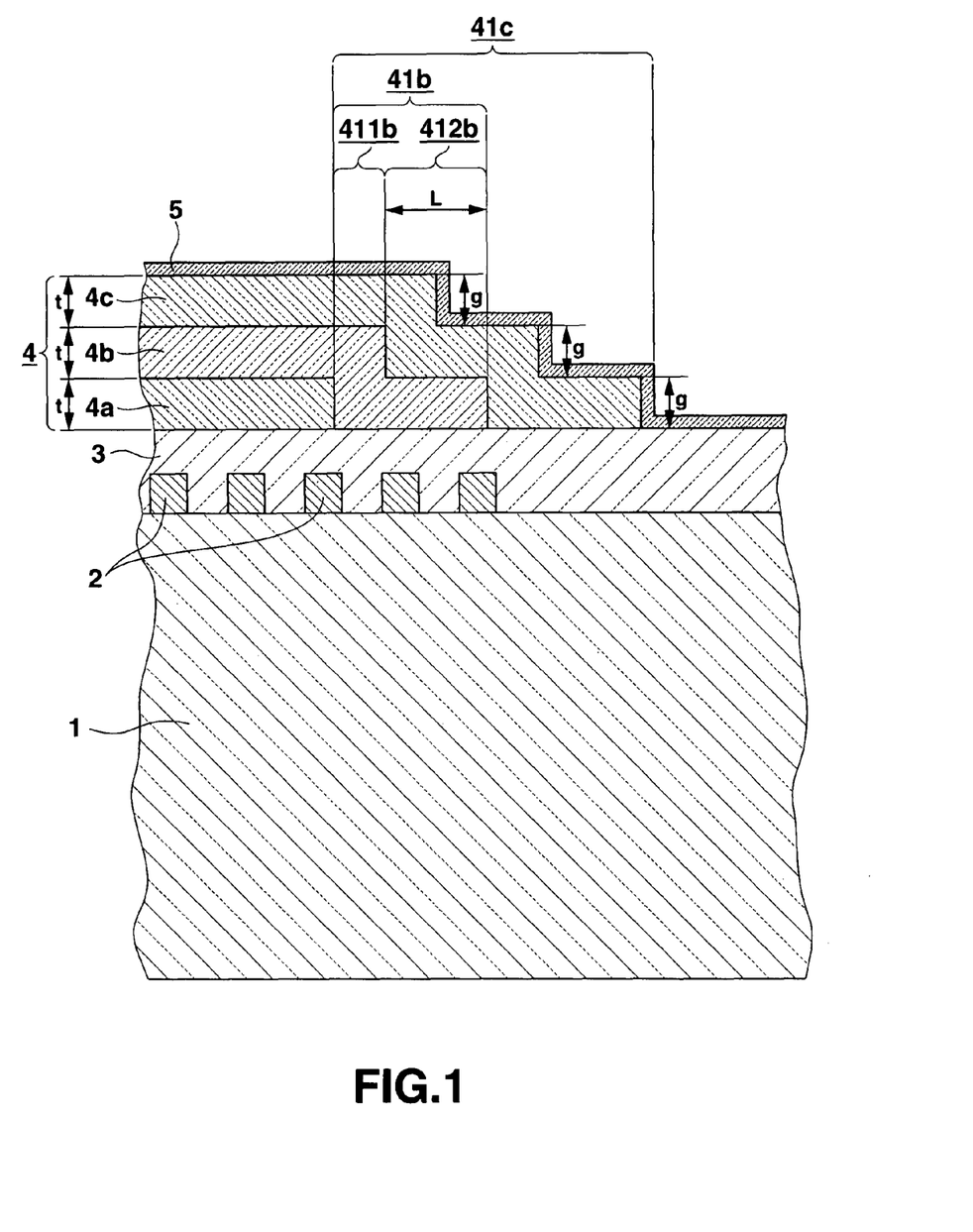
FIG. 1 is a schematic sectional view showing a fingerprint authentication device according to the first embodiment of the present invention by partially enlarging the device.

FIG. 1 is a sectional view showing a fingerprint authentication device according to the first embodiment of the present invention by partially enlarging the device. FIGS. 2A to 2D, 3A to 3D, and 4A to 4D are views for explaining steps of fabricating this fingerprint authentication device.

The fingerprint authentication device of this embodiment has an arrangement as shown in FIG. 1. That is, photosensors 2 are arranged in predetermined positions in a matrix on a glass substrate 1 having electrode lines (not shown). A transparent insulating film 3 is evenly formed to cover the photosensors 2. On the surface of the transparent insulating film 3, an undercoat 4 is formed by stacking three dry films 4a, 4b, and 4c formed into a predetermined pattern corresponding to the array area of the photosensors 2. An antistatic transparent electrode 5 is formed from the top of the pattern of the undercoat 4 having the three-layered structure to a region outside the pattern. The antistatic transparent electrode 5 is patterned into a predetermined shape.

The transparent insulating film 3, which comprises silicon nitride (SiN), is evenly formed on the surface of the glass substrate 1 by, e.g., CVD (Chemical Vapor Deposition) so as to cover the photosensors 2. The transparent insulating film 3 is provided for preventing short circuits between the electrode lines of the substrate 1 or between the electrode lines and the antistatic transparent electrode 5.

The undercoat 4 is provided not only as an undercoat that supports the antistatic transparent electrode 5, but also as a protective layer that reinforces the array area of the photosensors 2 and prevents deterioration of the photosensors 2. The three dry films 4a, 4b, and 4c constituting the undercoat 4 are formed to have the same thickness t by using the same photosensitive resin material. The photosensitive resin material used in this embodiment is prepared by mixing additives such as a polymerizable monomer and a photopolymerization initiator in a highly transparent acrylic resin as a base polymer. This photosensitive resin material is a negative type material in which a portion irradiated with light is hardened and remains.

Of the three stacked dry films 4a, 4b, and 4c, the first dry film 4a as the first layer is formed into a predetermined pattern on the surface of the transparent insulating film 3. The second dry film 4b as the second layer is stacked on the first dry film 4a so as to cover at least the surface and end face of the first dry film 4a. An end portion 41b of the second dry film 4b that covers the end face of the first dry film 4a has a vertical portion 411b formed along the end face of the first dry film 4a, and an extending portion 412b that extends by a dimension L along the surface of the insulating film 3. The extension dimension L is made larger than the value of the thickness t of the dry film.

Similarly, the third dry film 3c as the third layer is stacked to cover the surface and end face of the second dry film 4b. An end portion 41c of the third dry film that covers the end portion 41b of the second dry film is formed into a staircase shape including three steps equal in number to the stacked dry films. The height of each step is substantially equal to the thickness of the corresponding dry film. In this embodiment, the three dry films 4a, 4b, and 4c have the same thickness t. Therefore, a dimension g of each step is substantially equal to the thickness t of the dry films 4a to 4c.

On the substrate 1, the antistatic transparent electrode 5 is formed from the formation region of the third dry film 4c to a region outside the formation region. The antistatic transparent electrode 5 is provided for removing the static electricity of a finger placed in a fingerprint obtaining area on the undercoat 4.

The antistatic transparent electrode 5 is formed by patterning a thin film comprising a transparent conductive material such as ITO (Indium Tin Oxide) and having a thickness of about a few hundred Å to a few thousand Å by photolithography. In this embodiment as described above, the end face of the undercoat 4 has the staircase shape including the three steps equal in size. Therefore, the thin transparent conductive film can be easily and evenly formed following the small steps without causing any "poor step coverage".

When forming the antistatic transparent electrode 5 by patterning the evenly formed transparent conductive film by photolithography, a photoresist is formed on the transparent conductive film. The steps on the surface of this transparent conductive film are also substantially equal to the staircase steps formed on the surface of the third dry film 4c. Accordingly, the photoresists can be easily and evenly formed following these steps. This makes it possible to reliably and readily obtain the high-quality antistatic transparent electrode 5 formed into an accurate pattern without causing any "poor step coverage" or patterning defects.

Note that the thicknesses of the members constituting the fingerprint authentication device of this embodiment are set such that the thickness of the glass substrate 1 is 0.5 mm, the thickness of the insulating film 3 is approximately 1 μm, the thickness of each of the three dry films 4a, 4b, and 4c constituting the undercoat 4 is approximately 3 μm, the overall thickness of the undercoat 4 is approximately 10 μm, and the thickness of the antistatic transparent electrode 5 is 0.1 to 0.2 μm.

Note also that when detecting a fingerprint, the bulb of the fingertip on which the skin surface pattern exists of an object is placed in contact with the fingerprint sampling area on the undercoat 4, and light is irradiated from the front surface side (glass substrate 1 side) opposing the bulb, or from the side surface side or back surface side. The photosensors sense light transmitted through the glass substrate 1 and reflected by the skin surface pattern if the light is irradiated from the front surface side, or sense light transmitted through the fingertip if the light is irradiated from the back surface side, thereby sampling a fingerprint image.

Steps of forming an undercoat in a fingerprint authentication device fabrication method of this embodiment will be explained below with reference to FIGS. 2A to 2D, 3A to 3D, and 4A to 4D.

Figure 2A:
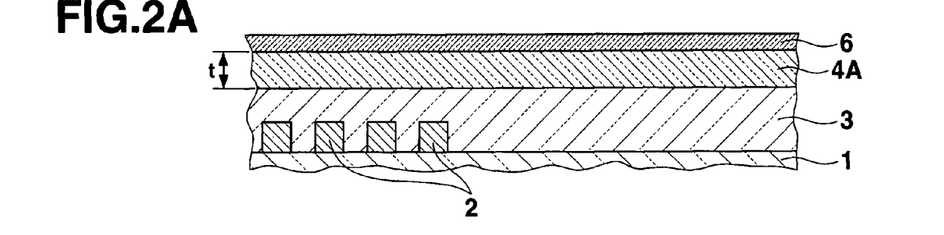
FIGS. 2A to 2D are views for explaining steps of a process of stacking a first layer of an undercoat in a method of fabricating the fingerprint authentication device according to the first embodiment.

First, as shown in FIG. 2A, a first dry film sheet 4A obtained by stacking a first dry film comprising the negative type photosensitive resin material described above on a transparent base sheet 6 is closely adhered on the flat surface of a transparent insulating film 3 evenly formed on a glass substrate 1 to cover photosensors 2. In this step, a thermocompression bonding tool (not shown) is pressed against the first dry film sheet 4A through the base sheet 6, thereby closely bonding the first dry film sheet 4A on the surface of the transparent insulating film 3 by compression while heating the first dry film sheet 4A to approximately 100° C. to 120° C.

Figure 2B:
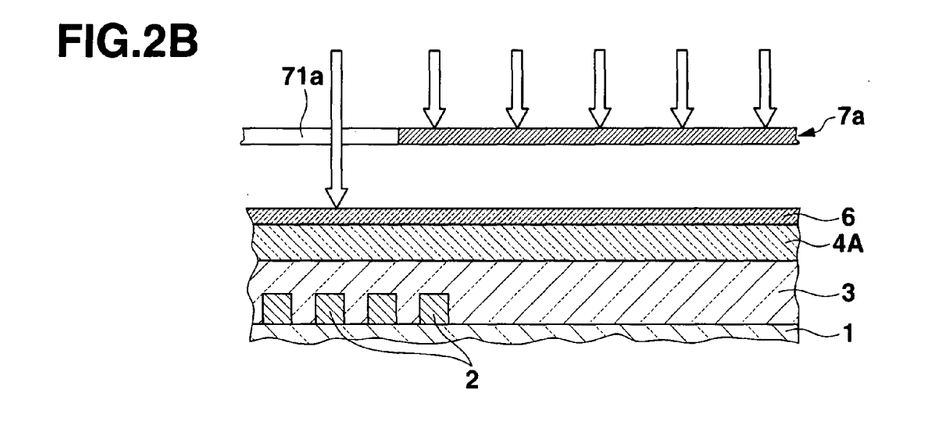

Then, the first dry film sheet 4A is exposed. In this exposure step, as shown in FIG. 2B, a first light-shielding mask 7a is positioned above the first dry film sheet 4A, on which the base sheet 6 is stacked, and light (indicated by the hollow arrows) is irradiated. Since the negative type photosensitive resin material is used as the material of the dry film, an opening 71a of the first light-shielding mask 7a used in this exposure step is formed to correspond to a first dry film 4a (FIG. 1) constituting the undercoat 4.

Figure 2C:
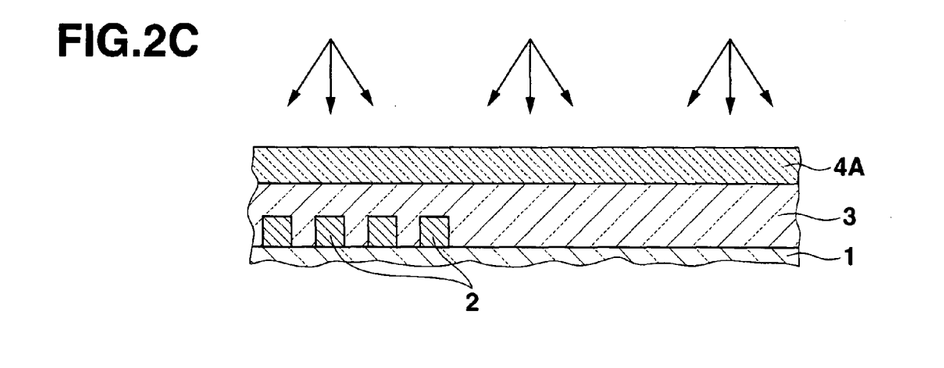
Figure 2D:
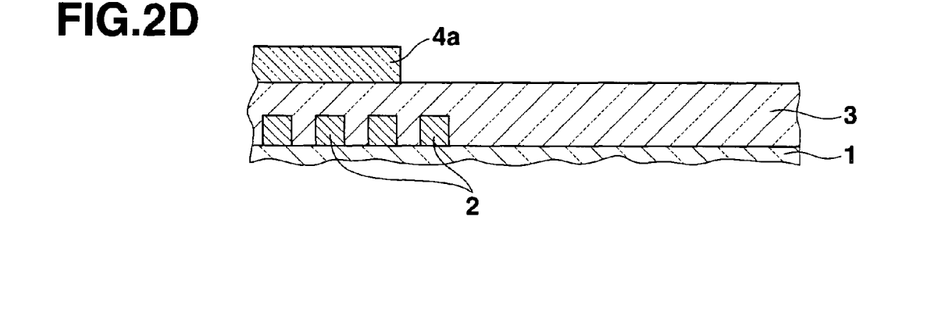

After that, as shown in FIG. 2C, the base sheet 6 is removed from the first dry film sheet 4A, and a developer is substantially evenly sprayed on the exposed surface of the first dry film sheet 4A as indicated by the arrows, thereby developing the surface. Consequently, as shown in FIG. 2D, the photosensitive material is removed from the area of the first dry film sheet 4A that is not irradiated with the light in the exposure step, and a portion irradiated with the light remains as a first dry film 4a.

Figure 3A:
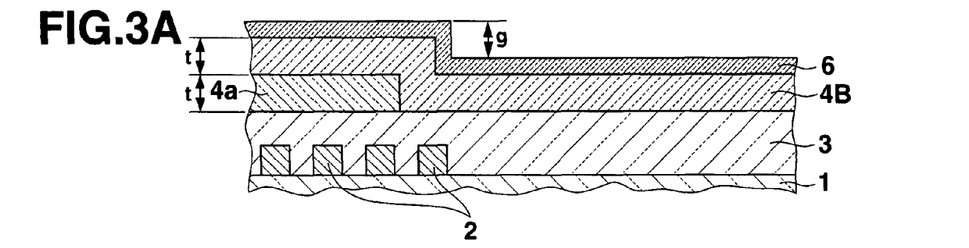
FIGS. 3A to 3D are views for explaining steps of a process of stacking a second layer of the undercoat in the method of fabricating the fingerprint authentication device according to the first embodiment.

Subsequently, a second dry film 4b (FIG. 1) is stacked on the first dry film 4a formed as described above. First, as shown in FIG. 3A, a second dry film sheet 4B on one surface of which a transparent base sheet 6 is stacked is laminated, with the surface of the base sheet 6 facing up, so as to closely cover the first dry film 4a and the surface of the glass substrate 1. In this step, as in the process of closely adhering the first dry film sheet 4A described above, a thermocompression bonding tool is pressed against the second dry film sheet 4B to compress it while heating it to approximately 120° C., thereby laminating it to closely follow even the end face of the first dry film 4a. Consequently, the dimension g of a step formed on the surface of the base sheet 6 to correspond to the end face of the first dry film 4a can be decreased to be substantially equal to the layer thickness t of the first dry film 4a.

Figure 3B:
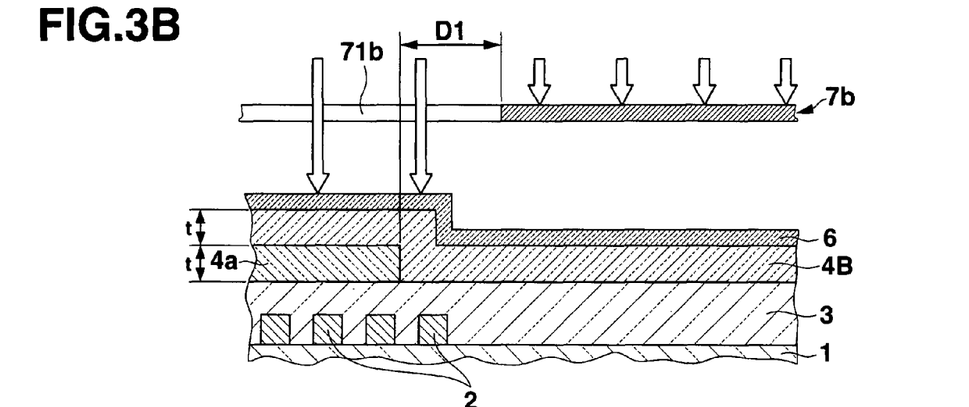

Then, as shown in FIG. 3B, exposure is performed using a second light-shielding mask 7b. The size of an opening 71b formed in the second light-shielding mask 7b is set equal to a size obtained by evenly expanding the area of the first dry film 4a throughout the entire circumference by an expansion dimension D1. The expansion dimension D1 is set larger than the double of the thickness t of the dry film 4.

Figure 3C:
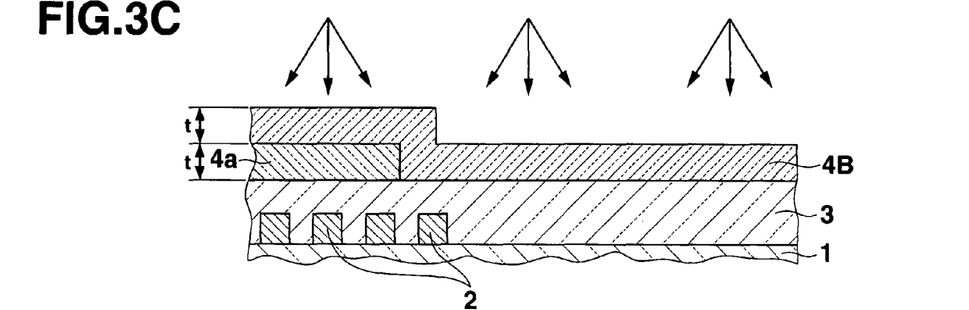
Figure 3D:
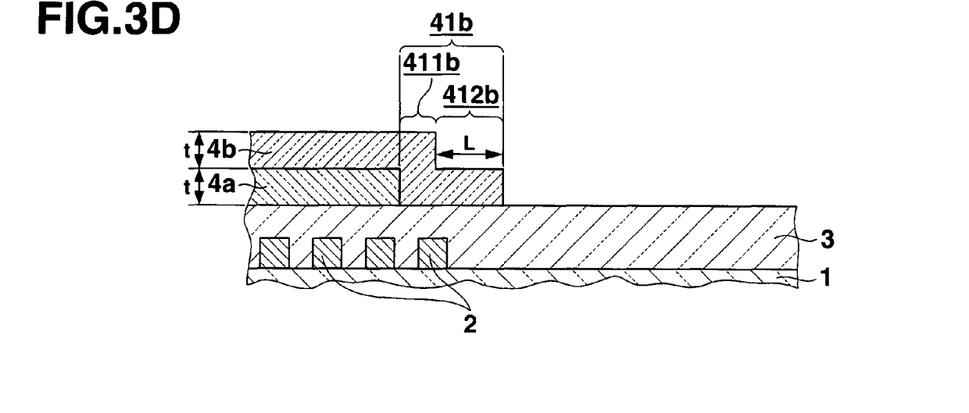

After that, as shown in FIG. 3C, development is performed in the same manner as when forming the first dry film 4a. Consequently, as shown in FIG. 3D, a second dry film 4b having two steps each having the dimension g on its end face is stacked. That is, an end portion 41b of the second dry film 4b that covers the end face of the first dry film 4a comprises a vertical portion 411b obtained by forming the second dry film sheet 4B having the thickness t along the end face of the first dry film 4a, and an extending portion 412b obtained by extending the second dry film sheet 4B along the surface of the transparent insulating film 3 by the dimension L. The extension dimension L of the extending portion 412b is roughly equal to a value calculated by subtracting the thickness t from the expansion dimension D1 of the opening 71b of the second light-shielding mask 7b.

Furthermore, a third dry film 4c (FIG. 1) is stacked on the second dry film 4b stacked as described above. Similar to the steps described above, first, as shown in FIG. 4A, a third dry film sheet 4C on one surface of which a transparent base sheet 6 is adhered is laminated, with the surface of the base sheet 6 facing up, so as to closely cover the second dry film 4b and the surface of the glass substrate 1.

Figure 4A:
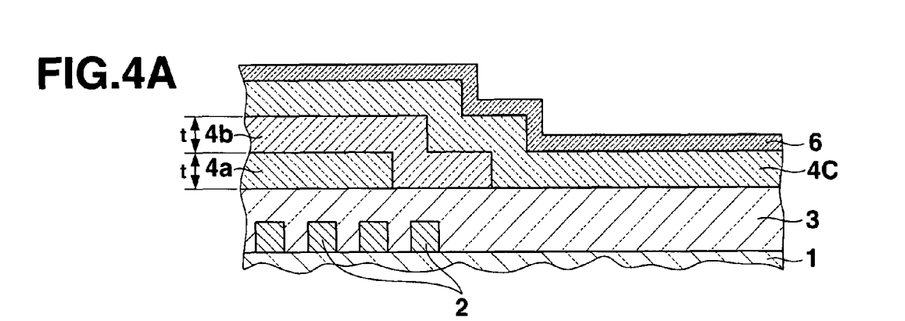
FIGS. 4A to 4D are views for explaining steps of a process of stacking a third layer of the undercoat in the method of fabricating the fingerprint authentication device according to the first embodiment.
Figure 4B:
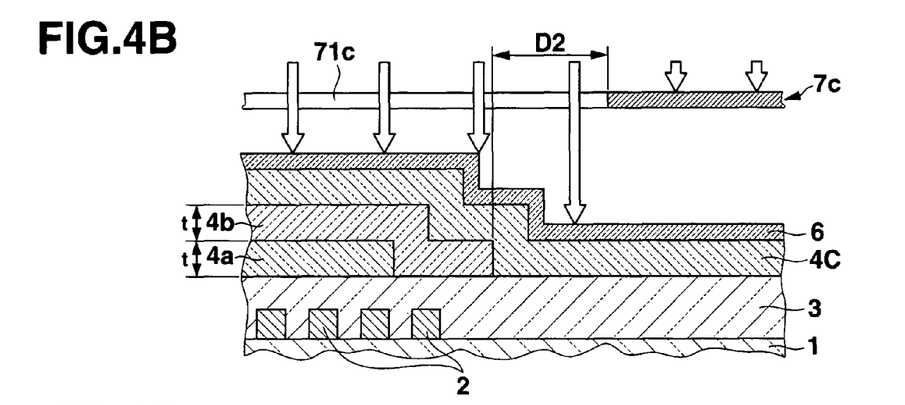

Then, as shown in FIG. 4B, exposure is performed using a third light-shielding mask 7c. The size of an opening 71c formed in the third light-shielding mask 7c is set equal to a size obtained by evenly expanding the opening 71b of the second light-shielding mask 7b throughout the entire circumference by an expansion dimension D2. The expansion dimension D2 need only be set larger than at least the thickness t of the dry film 4. This dimension is preferably larger than the double of the thickness t of the dry film 4, similar to the expansion dimension D1 of the second light-shielding mask 7b.

Figure 4C:
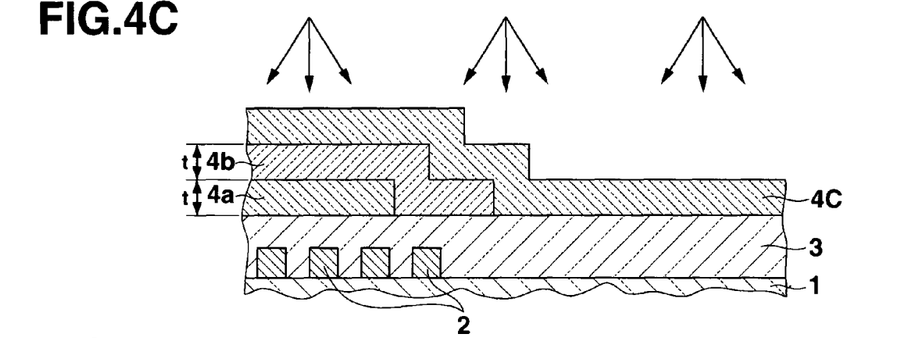
Figure 4D:
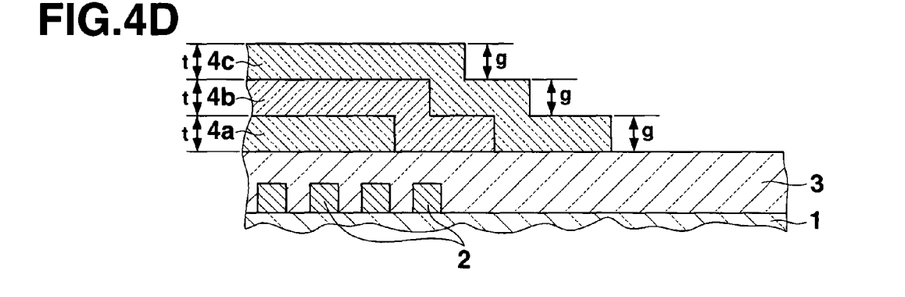

Subsequently, as shown in FIG. 4C, development is performed in the same manner as in the steps of developing the first and second dry film sheets 4A and 4B. Consequently, as shown in FIG. 4D, a third dry film 4c including, on its end face, three steps g each having a dimension equal to the thickness t of the dry film is stacked.

After that, the stacked first, second, and third dry films 4a, 4b, and 4c are hardened as they are simultaneously sintered at 230° C. to 240° C. A transparent conductive film comprising ITO is evenly formed by sputtering at 200° C. to 210° C. on the glass substrate 1 having all the exposed surfaces including the staircase end face of the third dry film 4c as the uppermost layer, i.e., all the exposed surfaces of the undercoat 4. The thin evenly formed ITO film is then patterned into a predetermined pattern by photolithography, thereby obtaining the fingerprint authentication device having the antistatic transparent electrode 5 on its surface shown in FIG. 1.

In the fingerprint authentication device of this embodiment as described above, the undercoat 4 supporting the antistatic transparent electrode 5 has the dry film stacked structure including the three layers equal in thickness, and the end face of this stacked structure has the staircase shape. The number of steps of the staircase is three, i.e., the same as the number of the stacked dry films 4a to 4c, and the dimension g of each step is the same as the thickness t of each of the dry films 4a to 4c. Since the dimension g of each step is as small as about ⅓ the thickness of the undercoat 4, the thin ITO film for forming the antistatic transparent electrode 5 can be evenly formed following the individual steps. The photoresist layer for patterning this thin ITO film can also be evenly formed following the individual steps. This makes it possible to reliably obtain the high-quality antistatic transparent electrode 5 free of "poor step coverage," by which the thin ITO film cannot follow the steps and breaks, and patterning defects caused by missing of the photoresist layer.

Furthermore, the undercoat 4 has the three-layered dry film stacked structure, which effectively prevents the formation of pinholes extending through the entire layer thickness of the undercoat 4, and reliably avoids damage to, e.g., the photosensors 2 or driver elements (not shown) caused by short circuits between the antistatic transparent electrode 5 and lines and the like on the glass substrate 1.

Also, the fingerprint authentication device fabrication method of this embodiment comprises the process of sequentially laminating the dry film sheets and repeating similar photolithography, so that the undercoat 4 having the stacked structure whose end face has the staircase shape including steps can be fabricated by minimizing the increase in number of fabrication steps caused by the formation of the stacked structure.

As a consequence, the fingerprint authentication device and the method of fabricating the same according to this embodiment make it possible to fabricate a high-yield, high-reliability fingerprint authentication device by preventing defects such as "poor step coverage" and patterning defects of the antistatic transparent electrode 5 and pinholes in the undercoat 4, and accurately patterning the high-quality antistatic transparent electrode 5.

Second Embodiment

A fingerprint authentication device and a method of fabricating the same according to the second embodiment of the present invention will be explained below with reference to FIGS. 5, 6A to 6D, 7A to 7D, and 8A to 8D. Note that the same reference numerals as in the above embodiment denote the same constituent elements, and a repetitive explanation will be omitted.

Figure 5:
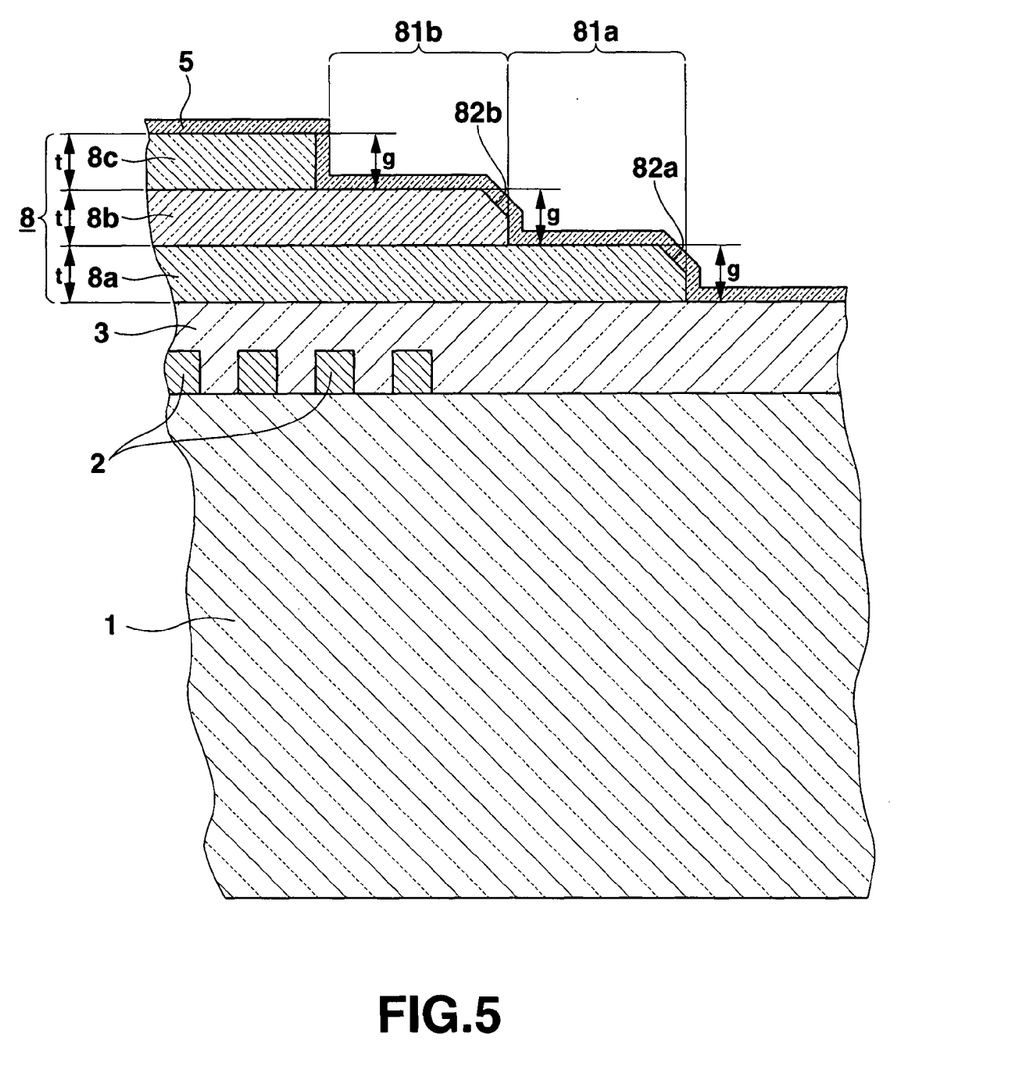
FIG. 5 is a schematic sectional view showing a fingerprint authentication device according to the second embodiment of the present invention by partially enlarging the device.

In the fingerprint authentication device of this embodiment, as shown in FIG. 5, photosensors 2 are arrayed into a predetermined arrangement on a glass substrate 1 having electrode lines (not shown). An insulating film 3 is evenly formed to cover the photosensors 2. On the surface of the insulating film 3, an undercoat 8 having a three-layered structure obtained by stacking three dry films 8a, 8b, and 8c is formed into a predetermined pattern corresponding to the array region of the photosensors 2. An antistatic transparent electrode 5 having a predetermined pattern is formed from the formation region of the undercoat 8 to a region outside this formation region. That is, the arrangement is substantially the same as the first embodiment except for the stacked structure of the undercoat 8.

As shown in FIG. 5, the undercoat 8 is formed by sequentially stacking, into a staircase shape, the three dry films 8a, 8b, and 8c comprising the same negative type photosensitive resin material using an acrylic resin as a base polymer as in the above embodiment. Of the three stacked dry films 8a, 8b, and 8c, the first dry film 8a as the first layer is formed into a predetermined pattern on the surface of the transparent insulating film 3. The second dry film 8b as the second layer is closely stacked on the surface of the first dry film 8a except for an end portion 81a. In addition, the third dry film 8c as the third layer is similarly closely stacked on the surface of the second dry film 8b except for an end portion 81b. As in the first embodiment, the end face of the undercoat 8 having this arrangement also has a staircase shape including three steps each having a dimension g equal to a thickness t of each of the dry films 8a, 8b, and 8c.

In this structure, the edges of the first dry film 8a as the first layer and the second dry film 8b as the second layer are chamfered. "Poor step coverage" and patterning defects of the antistatic transparent electrode 5 readily occur in edge portions where the undercoat is square. Therefore, chamfering the edges of the first and second dry films 8a and 8b prevents "poor step coverage" and patterning defects of the antistatic transparent electrode 5 formed from the formation area of the undercoat 8 to its outside area. Note that the area of a chamfered portion 82a of the first dry film 8a is larger than that of a chamfered portion 82b of the second dry film 8b for reasons of the fabrication method.

Undercoat formation steps in the fingerprint authentication device fabrication method of this embodiment will be explained below with reference to FIGS. 6A to 6D, 7A to 7D, and 8A to 8D.

Figure 6A:
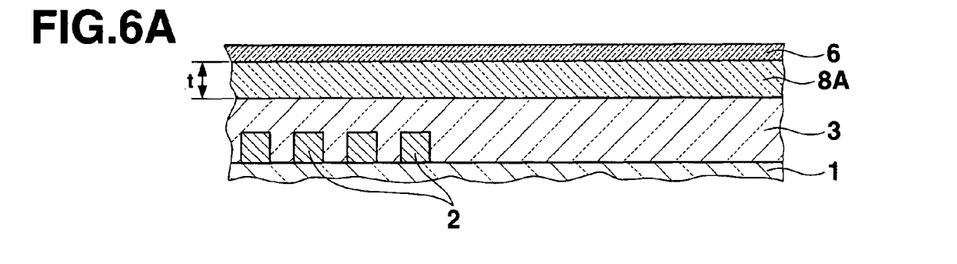
FIGS. 6A to 6D are views for explaining steps of a process of stacking a first layer of an undercoat in a method of fabricating the fingerprint authentication device according to the second embodiment.

First, as shown in FIG. 6A, a first dry film sheet 8A comprising the negative type photosensitive resin material described previously is closely adhered on the flat surface of an insulating film 3 evenly formed on a glass substrate 1 to cover photosensors 2. More specifically, as in the first embodiment described above, a thermocompression bonding tool (not shown) is used to closely bond the first dry film sheet 8A on the surface of the insulating film 3 by compression while heating the first dry film sheet 8A to approximately 100° C. to 120° C. through a transparent base sheet 6.

Figure 6B:
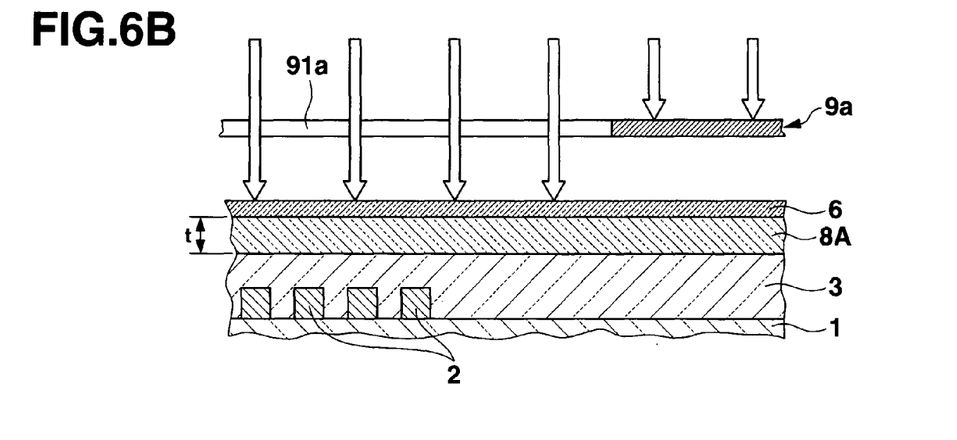

Then, the first dry film sheet 8A is exposed. As shown in FIG. 6B, the first dry film sheet 8A having the base sheet 6 on it is irradiated with light (indicated by the hollow arrows) through a first light-shielding mask 9a. An opening 91a of the first light-shielding mask 9a used in this exposure step is formed to correspond to the formation area of the first dry film 8a (FIG. 5) constituting the undercoat 8, because the negative type photosensitive resin material is used as the material of the dry film.

Figure 6C:
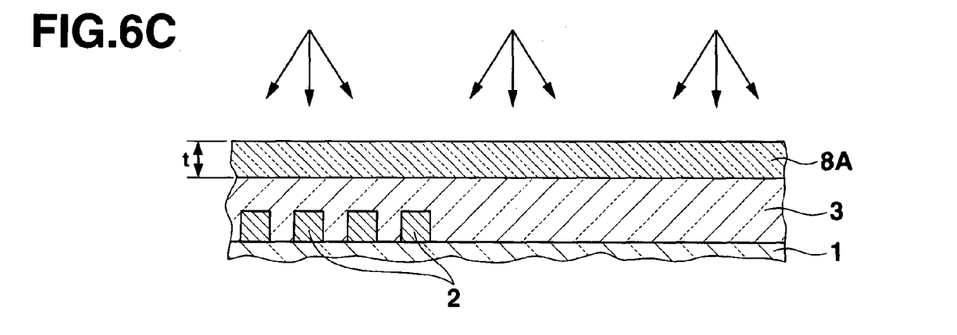
Figure 6D:
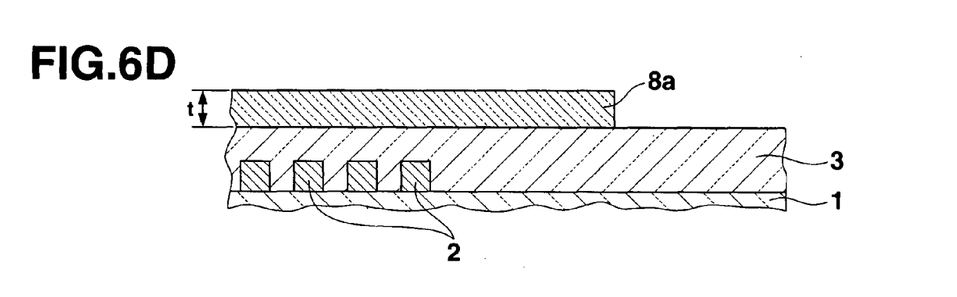

After that, the base sheet 6 is removed from the first dry film sheet 8A. As shown in FIG. 6C, a developer is substantially evenly sprayed on the exposed surface of the first dry film sheet 8A as indicated by the arrows, thereby developing the surface. Consequently, as shown in FIG. 6D, the photosensitive material is removed from the area of the first dry film sheet 8A that is not irradiated with the light in the exposure step, and a portion irradiated with the light remains as a first dry film 8a.

Figure 7A:
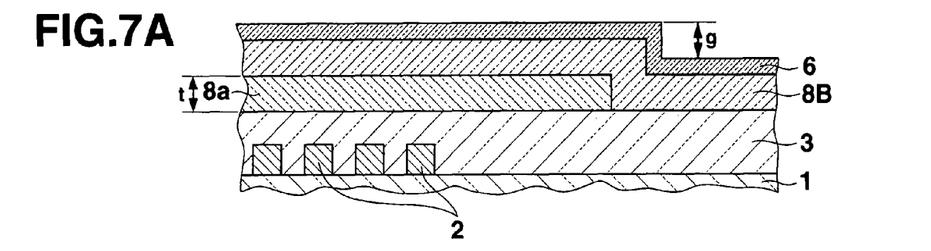
FIGS. 7A to 7D are views for explaining steps of a process of stacking a second layer of the undercoat in the method of fabricating the fingerprint authentication device according to the second embodiment.

Subsequently, a second dry film 8b is stacked on the first dry film 8a formed as described above. First, as shown in FIG. 7A, a second dry film sheet 8B on one surface of which a transparent base sheet 6 is stacked is laminated, with the surface of the base sheet facing up, so as to closely cover the first dry film 8a and the surface of the glass substrate 1. In this step, as in the process of closely adhering the first dry film sheet 8A described above, a thermocompression bonding tool is pressed against the second dry film sheet 8B to compress it while heating it to approximately 120° C., thereby laminating it to closely follow even the end face of the first dry film 8a. Consequently, the dimension g of a step formed on the surface of the base sheet 6 to correspond to the end face of the first dry film 8a can be decreased to be substantially equal to the layer thickness t of the first dry film 8a.

Figure 7B:
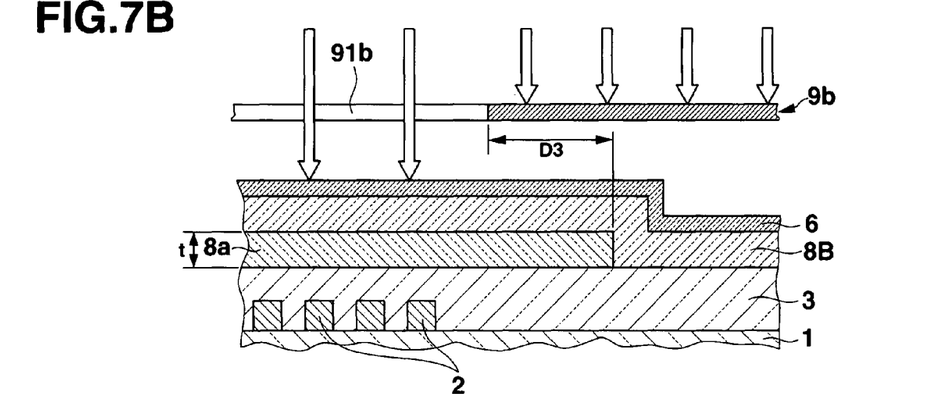

Then, as shown in FIG. 7B, exposure is performed using a second light-shielding mask 9b. The size of an opening 91b formed in the second light-shielding mask 9b is set equal to a size obtained by evenly reducing the formation area of the first dry film 8a throughout the entire circumference by a reduction dimension D3.

Figure 7C:
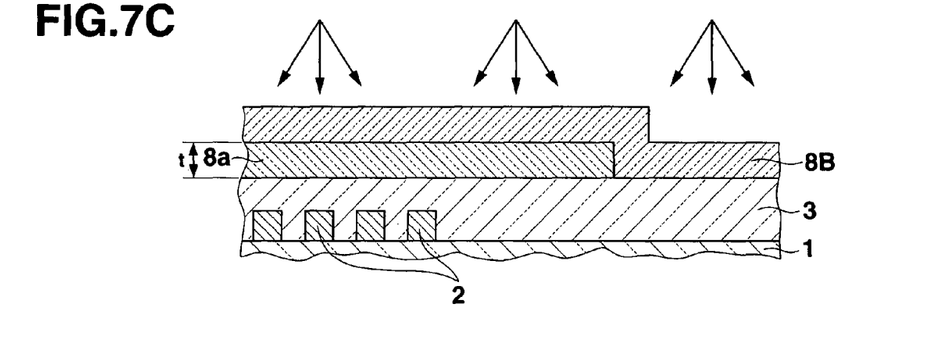
Figure 7D:
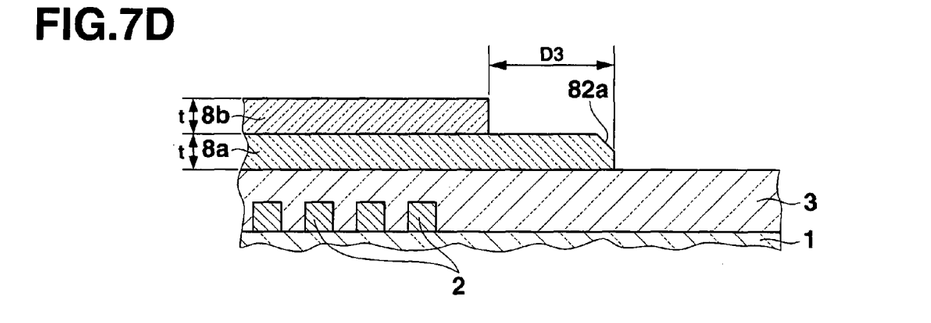

After that, as shown in FIG. 7C, development is performed in the same manner as when forming the first dry film 8a. Consequently, as shown in FIG. 7D, a second dry film 8b is stacked and formed on the first dry film 8a, with the end face of the second dry film 8b being removed inward (toward the central portion) from the end face of the first dry film 8a as the lower layer by the reduction dimension D3 of the opening 91b of the second light-shielding mask 9b. That is, the flat second dry film 8b having an area smaller than that of the flat first dry film 8a by the reduction dimension D3 throughout the entire circumference is stacked on the flat first dry film 8a.

In the development step, the end portion of the first dry film 8a on which the second dry film 8b is not stacked is exposed to the developer, and the edge of this end portion is chamfered, thereby forming a chamfered portion 82a having an inclined surface.

Figure 8A:
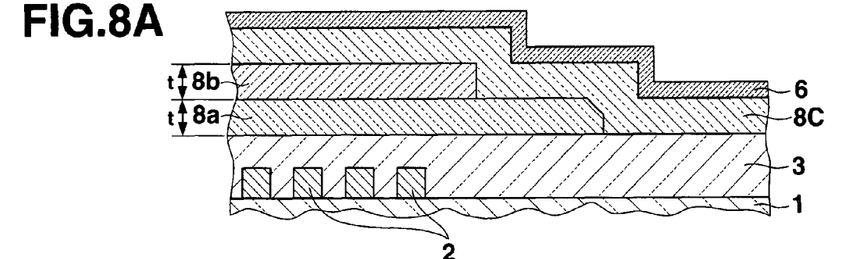
FIGS. 8A to 8D are views for explaining steps of a process of stacking a third layer of the undercoat in the method of fabricating the fingerprint authentication device according to the second embodiment.

Furthermore, a third dry film 8c is stacked on the second dry film 8b stacked as described above. First, as shown in FIG. 8A, a third dry film sheet 8C on one surface of which a transparent base sheet 6 is adhered is laminated, with the surface of the base sheet 6 facing up, so as to closely cover the second dry film 8b, the end portion of the first dry film 8a, and the surface of the glass substrate 1.

Figure 8B:
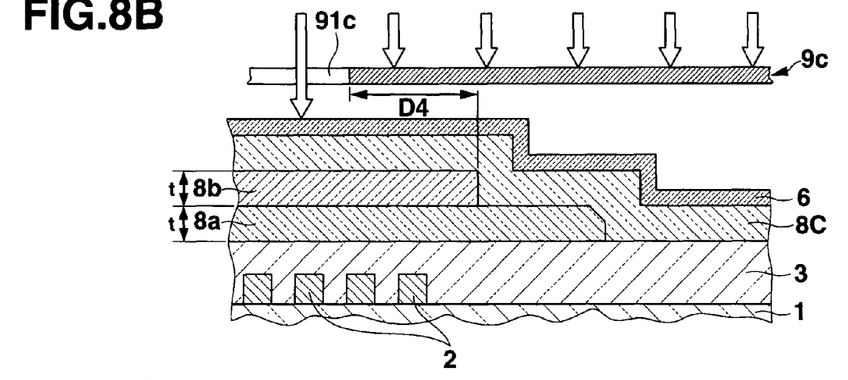

Then, as shown in FIG. 8B, exposure is performed using a third light-shielding mask 9c. The size of an opening 91c formed in the third light-shielding mask 9c is set to be a size obtained by evenly reducing the opening 91b of the second light-shielding mask 9b by a reduction dimension D4 throughout the entire circumference. The reduction dimension D4 is preferably larger than the thickness t of the dry film 8, similar to the reduction dimension D3 of the second light-shielding mask 9b.

Figure 8C:
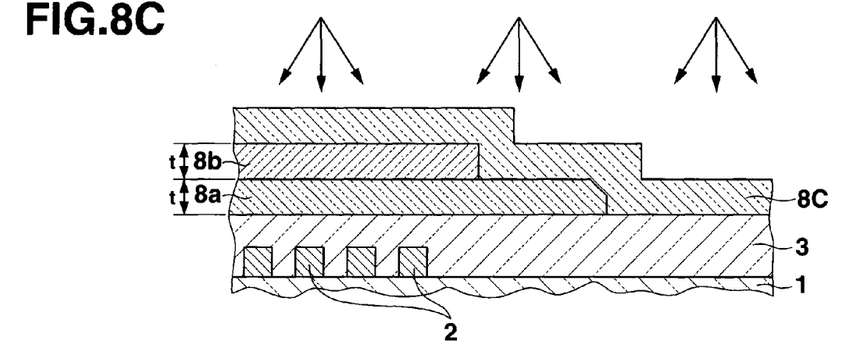
Figure 8D:
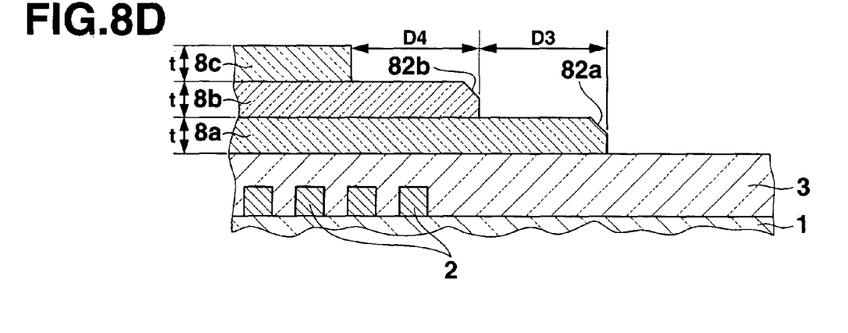

Subsequently, as shown in FIG. 8C, development is performed in the same manner as in the steps of developing the first and second dry film sheets 8A and 8B. Consequently, as shown in FIG. 8D, a third dry film 8c is stacked and formed on the second dry film 8b, with the end face of the third dry film 8c being removed inward from that of the second dry film 8b as the lower layer by the reduction dimension D4 of the opening 91c of the third light-shielding mask 9c. That is, the flat second dry film 8b having an area smaller than that of the flat first dry film 8a by the reduction dimension D3 throughout the entire circumference and the third dry film 8c having an area smaller than that of the second dry film 8b by the reduction dimension D4 throughout the entire circumference are sequentially stacked on the flat first dry film 8a.

In this development step, the end portion of the first dry film 8a on which the second dry film 8b is not stacked and the end portion of the second dry film 8b on which the third dry film 8c is not stacked are exposed to the developer. This chamfers the edge portion of the second dry film 8*b* to form a chamfered portion 82*b* having an inclined surface. Furthermore, the chamfered portion 82*a* of the first dry film 8*a* is exposed to the developer again and enlarges, so the area of the inclined surface increases.

After that, the stacked first, second, and third dry films 8*a*, 8*b*, and 8*c* are hardened as they are simultaneously sintered at 230° C. to 240° C. A transparent conductive film comprising ITO is evenly formed by sputtering at 200° C. to 210° C. on the surface and end face of the third dry film 8*c*, the exposed end portion surface and end face of the second dry film 8*b*, and the exposed end portion surface and end face of the first dry film 8*a*, i.e., on all the exposed surfaces of the undercoat 8 and on the glass substrate 1 outside the undercoat 8. The thin evenly formed ITO film is then patterned into a predetermined pattern by photolithography, thereby obtaining the fingerprint authentication device having the antistatic transparent electrode 5 formed into a desired pattern on its surface shown in FIG. 5.

In the fingerprint authentication device of the second embodiment as described above, similar to the first embodiment, the undercoat 8 supporting the antistatic transparent electrode 5 formed on the surface has the dry film stacked structure including the three layers equal in thickness, and the end face of this stacked structure has the staircase shape. The number of steps of the staircase is three, i.e., the same as the number of the stacked first to third dry films 8*a* to 8*c*, and the dimension g of each step is the same as the thickness t of each of the first to third dry films 8*a* to 8*c*. In addition, the edges of the first and second dry films 8*a* and 8*b* are chamfered to form inclined surfaces. Since the dimension g of each step is as small as about ⅓ the thickness of the undercoat 8 and the amount of edges to which a thin film is difficult to adhere reduces, the thin ITO film for forming the antistatic transparent electrode 5 can be evenly and easily formed following the individual steps. The photoresist layer for patterning this thin ITO film can also be evenly and easily formed following the individual steps. This makes it possible to reliably obtain the high-quality antistatic transparent electrode 5 free of "poor step coverage" by which the thin ITO film cannot follow the steps and breaks, and patterning defects produced by missing of the photoresist layer.

Furthermore, the undercoat 8 has the three-layered dry film stacked structure. This effectively prevents the formation of pinholes extending through the entire layer thickness of the undercoat 8, and reliably avoids short circuits between the antistatic transparent electrodes 5 and lines and the like on the glass substrate 1.

Also, the fingerprint authentication device fabrication method of this embodiment sequentially laminates the dry film sheets, and sequentially decreases the sizes of the openings of the light-shielding masks for use in photolithography repetitively performed on these dry film sheets. Accordingly, the edge portions of the steps are automatically chamfered in the fabrication steps. This makes it possible to form the desired undercoat 8 whose end face includes the steps equal in number to the stacked dry films and has the staircase shape in which the edge portions are chamfered, by substantially the same number of fabrication steps as in the fabrication method of the first embodiment.

As a consequence, the fingerprint authentication device and the method of fabricating the same according to this embodiment make it possible to fabricate a fingerprint authentication device that has further improved in yield and reliability by preventing "poor step coverage" and patterning defects and accurately patterning the antistatic transparent electrode 5.

Note that the present invention is not limited to the above embodiments.

For example, the number of layers stacked as the undercoat having the stacked structure is three in both the first and second embodiments described above. However, the number of stacked layers may also be two or four or more. In this case, the materials and thicknesses of these layers need not be the same, and can be appropriately selected and set in accordance with the application of the thin film device substrate.

Also, the dry film material for use in the fabrication methods of the present invention is not limited to the negative type photosensitive resin material, and may also be a positive type photosensitive resin material. In this case, even when the stacked structure of the undercoat is a structure in which an upper layer covers a lower layer as in the first embodiment, it is possible to form a favorable undercoat having an end face edge portion that is automatically chamfered by development.

In addition, the present invention is of course widely applicable not only to the fingerprint authentication device substrate but also to various kinds of device substrates on the surfaces of which thin film patterns are formed.

As described above, according to the present invention, a thin film device comprises a substrate having thin film elements, an undercoat formed on the thin film elements of the substrate and comprising at least one insulating film formed into a predetermined shape by closely adhering, exposing, and etching a film comprising a photosensitive resin material, and a thin film pattern formed into a predetermined shape on the undercoat.

In the thin film device, preferably, the undercoat is formed by stacking dry films comprising a photosensitive resin material, and the dry films comprise insulating films having different sizes and are sequentially stacked so that end faces thereof do not align with each other. In this case, desirably, of the insulating films forming the layers of the undercoat, a lower insulating film on a substrate side has an area smaller than an area of an upper insulating film, and the upper insulating film is stacked to cover the lower insulating film. Also, desirably, of the insulating films forming the layers of the undercoat, a lower insulating film on a substrate side has an area larger than an area of an upper insulating film, and the upper insulating film is stacked on the lower insulating film. In this case, of the insulating films of the undercoat, an edge portion of an end face of the lower insulating film on the substrate side is desirably removed.

In the thin film device according to the present invention, preferably, photosensors for detecting a fingerprint of an object and a transparent insulating film covering the photosensors are formed on the substrate, the undercoat is formed by stacking substantially transparent dry films on the transparent insulating film, and the thin film pattern comprises a transparent conductive film formed into a predetermined shape on the undercoat, and forms an antistatic film having a surface with which a finger of an object is brought into contact.

According to the present invention, a fingerprint detecting device preferably comprises a substrate having photosensors for detecting a fingerprint of an object, and a transparent insulating film covering the photosensors, an undercoat formed on the transparent insulating film formed on the substrate and into a predetermined shape including a portion that corresponds to the photosensors, the undercoat comprising insulating films formed by dry films comprising a photosensitive resin, having different sizes, and stacked so that end faces thereof do not align with each other, and an antistatic film comprising a transparent conductive film formed into a predetermined pattern on the undercoat and the transparent insulating film on the substrate.

In the fingerprint detecting device, preferably, of the insulating films of the undercoat, a lower insulating film on a substrate side has an area smaller than an area of an upper insulating film, and the upper insulating film is stacked to cover the lower insulating film. Also preferably, of the insulating films of the undercoat, a lower insulating film on a substrate side has an area larger than an area of an upper insulating film, and the upper insulating film is stacked on the lower insulating film. In this case, of the insulating films of the undercoat, an edge portion of an end face of the lower insulating film on the substrate side is preferably removed.

According to the present invention, a thin film device fabrication method preferably comprises steps of preparing a substrate having thin film elements, forming an undercoat comprising at least one insulating film formed into a predetermined shape by closely adhering at least one film comprising a photosensitive resin material on the thin film elements of the substrate, and exposing and etching the film, and forming a thin film pattern into a predetermined shape on the undercoat.

In the thin film device fabrication method, the step of forming the undercoat preferably comprises a step of stacking insulating films having different sizes so that end faces of the insulating films forming individual layers do not align with each other. In this case, the step of forming the undercoat desirably comprises a step of sequentially stacking the insulating films so that a lower insulating film on a substrate side has an area smaller than an area of an upper insulating film and the upper insulating film is stacked to cover the lower insulating film. Also, the step of forming the undercoat desirably comprises a step of sequentially stacking the insulating films so that a lower insulating film on a substrate side has an area larger than an area of an upper insulating film and the upper insulating film is stacked on the lower insulating film. Also, the step of preparing a substrate desirably comprises a step of forming a transparent insulating film on the substrate having the thin film elements.

In the thin film device fabrication method according to the present invention, the step of forming the undercoat preferably comprises a first step of forming a first insulating film having a predetermined pattern shape by closely adhering a first dry film comprising a photosensitive resin material on the thin film elements of the substrate, and performing photolithography by using a first light-shielding mask having an opening with a predetermined shape, a second step of forming a second insulating film having a predetermined pattern shape by closely adhering a second dry film comprising a photosensitive resin material on the substrate on which the first insulating film is formed, and performing photolithography by using a second light-shielding mask having an opening different in size from the opening of the first light-shielding mask, and a third step of forming a third insulating film having a predetermined pattern shape by closely adhering a third dry film comprising a photosensitive resin material on the substrate on which the second insulating film is formed, and performing photolithography by using a third light-shielding mask having an opening different in size from the openings of the first light-shielding mask and the second light-shielding mask. In this case, desirably, in the first step, the second step, and the third step, the first dry film, the second dry film, and the third dry film are respectively exposed by using the first light-shielding mask, the second light-shielding mask, and the third light-shielding mask formed so that the opening of the second light-shield mask is smaller than the opening of the first light-shielding mask and the opening of the third light-shielding mask is smaller than the opening of the second light-shielding mask. Also desirably, the second step comprises a step of removing an edge portion of an end portion of the first insulating film formed in the first step, and the third step comprises a step of removing edge portions of end portions of the first insulating film and the second insulating film respectively formed in the first step and the second step.

In the thin film device fabrication method according to the present invention, in the step of forming a thin film pattern, the thin film pattern is preferably formed from a formation region of the undercoat to a region outside the formation region. In this case, each of the dry films desirably comprises a negative type photosensitive resin.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A thin film device comprising:
   a substrate;
   thin film elements formed on the substrate;
   an undercoat which covers the thin film elements and which is provided on a part of an area of the substrate, the undercoat having a layered structure in which a plurality of sequentially laminated insulative dry films are disposed over the thin film elements, each of the dry films comprising a photosensitive resin material; and
   a conductive thin film pattern comprising a sheet of film which covers an outer surface of the undercoat, and which covers at least a part of an area of the substrate on which the undercoat is not provided,
   wherein an end face of the undercoat which is on a side of the area of the substrate on which the undercoat is not formed is formed into a staircase shape,
   wherein a height of the undercoat with respect to the substrate reduces in stages as the undercoat approaches the side of the area of the substrate on which the undercoat is not formed, with a number of steps of the staircase shape being equal to a number of the sheets of the dry films, and
   wherein the thin film pattern covers the staircase-shaped end face of the undercoat.

2. A thin film device according to claim 1, wherein the thin film elements comprise photosensors and a transparent insulating film is formed between the photosensors and the undercoat.

3. A thin film device according to claim 1, wherein the dry films have a same thickness.

4. A thin film device according to claim 1, wherein the sheets of insulative dry films comprising the undercoat have different sizes with respect to each other, and end portions of the dry films are positioned at different locations on the substrate.

5. A thin film device according to claim 1, wherein each of the dry films is thicker than a film thickness of the thin film pattern.

6. A thin film device according to claim 4, wherein an area of an upper dry film of the undercoat is smaller than an area of a lower dry film of the undercoat, and the upper dry film is arranged within a perimeter of the lower dry film.

7. A thin film device according to claim 6, wherein edge portions of the end portions of the dry films other than an uppermost dry film among the plurality of sheets of dry films is chamfered.

8. A fingerprint detecting device comprising:
a substrate;
photosensors formed on the substrate;
a transparent insulating film formed on the substrate to cover the photosensors;
an undercoat which covers the photosensors and which is formed on the transparent insulating film, the undercoat having a layered structure in which a plurality of sequentially laminated sheets of insulative dry films are disposed over the transparent insulating film, each of the dry films comprising a photosensitive resin material; and
an antistatic film comprising a transparent conductive film comprising a sheet of film which covers an outer surface of the undercoat, and which covers at least a part of an area of the transparent insulating film on which the undercoat is not provided,
wherein an end face of the undercoat which is on a side of the area of the substrate on which the undercoat is not formed is formed into a staircase shape,
wherein a height of the undercoat with respect to the substrate reduces in stages as the undercoat approaches the side of the area of the substrate on which the undercoat is not formed, with a number of steps of the staircase shape being equal to a number of the sheets of the dry films, and
wherein the antistatic film covers the staircase-shaped end face of the undercoat.

9. A fingerprint detecting device according to claim 8, wherein the photosensors are positioned to acquire a fingerprint image of a finger touching a predetermined fingerprint sampling area.

10. A fingerprint detecting device according to claim 8, wherein the sheets of insulative dry films comprising the undercoat have different sizes with respect to each other, and end portions of the dry films are positioned at different locations on the substrate.

11. A fingerprint detecting device according to claim 10, wherein an area of an upper dry film of the undercoat is larger than an area of a lower dry film of the undercoat, and the upper dry film covers the end portion of the lower dry film.

12. A fingerprint detecting device according to claim 10, wherein an area of an upper dry film of the undercoat is smaller than an area of a lower dry film of the undercoat, and the upper dry film is arranged within a perimeter of the lower dry film.

13. A fingerprint detecting device according to claim 12, wherein edge portions of the end portions of the dry films other than an uppermost dry film among the plurality of sheets of dry films is chamfered.

14. A thin film device comprising:
a substrate;
thin film elements formed on the substrate;
an undercoat covering the thin film elements which is provided on a part of an area of the substrate; and
a conductive thin film pattern comprising a sheet of film which covers an outer surface of the undercoat, and which covers at least a part of an area of the substrate on which the undercoat is not provided,
wherein the undercoat has a layered structure comprising:
a first dry film comprising insulative material which is laminated on the thin film elements, the first dry film having a first end portion at a side of the undercoat near the area of the substrate on which the undercoat is not formed;
a second dry film comprising insulative material which is laminated on the first dry film, the second dry film having a second end portion at the side of the undercoat near the area of the substrate on which the undercoat is not formed; and
a third dry film comprising insulative material which is laminated on the second dry film, the third dry film having to have a third end portion at the side of the undercoat near the area of the substrate on which the undercoat is not formed;
wherein the first, second and third dry films have different sizes and such that the end portions of the first, second and third dry films are provided at different locations on the substrate,
wherein an end face of the undercoat which is on a side of the area of the substrate on which the undercoat is not formed is formed into a staircase shape,
wherein a height of the undercoat with respect to the substrate reduces in stages as the undercoat approaches the side of the area of the substrate on which the undercoat is not formed, with a number of steps of the staircase shape being equal to a number of the sheets of the dry films; and
wherein the thin film pattern comes in contact with the first end portion, the second end portion, and the third end portion.

15. A thin film device according to claim 14, wherein:
the second dry film has an area smaller than an area of the first dry film so that a whole area of the second dry film overlaps the first dry film; and
the third dry film has an area smaller than an area of the first dry film so that a whole area of the third dry film overlaps the second dry film.

16. A thin film device according to claim 15, wherein the thin film pattern covers the first end portion of the first dry film, the second end portion of the second dry film, and the third end portion of the third dry film.

17. A thin film device according to claim 14, wherein the first, second and third dry films have a same thickness.

18. A thin film device according to claim 14, wherein the thin film elements comprise photosensors.

* * * * *